United States Patent [19]
Cullen

[11] Patent Number: 5,355,659
[45] Date of Patent: Oct. 18, 1994

[54] AGRICULTURAL FEED BAGGING MACHINE HAVING A LENGTH ADJUSTABLE TUNNEL

[76] Inventor: Steven R. Cullen, Box 642, Astoria, Oreg. 97103

[21] Appl. No.: 200,761

[22] Filed: Feb. 23, 1994

[51] Int. Cl.5 .......................... B65B 9/10; B65B 9/15; B65B 25/02
[52] U.S. Cl. ...................... 53/567; 100/100; 100/65; 53/576
[58] Field of Search ............ 53/527, 530, 567, 570, 53/575, 576, 261; 100/100, 144, 65

[56] References Cited

U.S. PATENT DOCUMENTS

| | | | |
|---|---|---|---|
| 1,953,850 | 4/1934 | Fanghanel et al. | 53/257 |
| 3,722,561 | 3/1973 | O'Leary et al. | 53/527 |
| 4,051,644 | 10/1977 | Eide et al. | 53/257 |
| 4,308,901 | 1/1982 | Lee | 100/100 |
| 4,310,036 | 1/1982 | Rasmussen et al. | 141/114 |
| 4,337,805 | 7/1982 | Johnson et al. | 53/576 |
| 4,688,480 | 8/1987 | Ryan | 100/144 |
| 4,949,633 | 8/1990 | Johnson et al. | 100/65 |

Primary Examiner—Horace M. Culver
Assistant Examiner—Rodney Butler
Attorney, Agent, or Firm—Zarley, McKee, Thomte, Voorhees & Sease

[57] ABSTRACT

An agricultural feed bagging machine including a length adjustable tunnel is provided to permit the adjustment of the compaction resistance offered by the tunnel. The length adjustable tunnel comprises an outer tunnel shell which is movably mounted on a fixed inner tunnel shell so that the length of the tunnel may be selectively varied. A pair of hydraulic cylinders are connected to the outer tunnel shell for moving the outer tunnel shell relative to the inner tunnel shell.

4 Claims, 2 Drawing Sheets

AGRICULTURAL FEED BAGGING MACHINE HAVING A LENGTH ADJUSTABLE TUNNEL

BACKGROUND OF THE INVENTION

1. Field of the Invention

This invention relates to an agricultural feed bagging machine and more particularly to an agricultural feed bagging machine having a length adjustable tunnel.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve compaction of the silage material within the bag.

The amount of compaction of the silage material within the bag will vary with the type of silage materials being bagged, moisture content, length of cuttings, etc. Further, the length of the tunnel has an affect on the amount of compaction of the material within the bag.

SUMMARY OF THE INVENTION

An agricultural feed bagging machine is disclosed which comprises a wheeled frame having rearward and forward ends with a tunnel mounted thereon which has an intake end for receiving silage material and an output end adapted to receive the mouth of an agricultural bag. A hopper is provided on the wheeled frame for receiving the silage material and which is adapted to supply the same to a rotatable rotor which forces the silage into the tunnel and into the bag. The tunnel is comprised of an inner tunnel shell which is fixed to the wheeled frame and which has a outer tunnel shell longitudinally movably mounted thereon. A pair of hydraulic cylinders are operatively connected to the outer tunnel shell selectively so that the outer tunnel shell may be moved rearwardly or forwardly with respect to the inner tunnel shell to increase or decrease the length of the tunnel respectively. The fact that the tunnel length may be selectively varied permits the compaction of the material within the bag. The adjustable tunnel length also enables the width of the machine to be reduced without sacrificing compaction requirements.

It is therefore a principal object of the invention to provide an improved agricultural feed bagging machine.

A further object of the invention is to provide an agricultural feed bagging machine having a length adjustable tunnel.

Still another object of the invention is to provide an agricultural feed bagging machine having a length adjustable tunnel which provides an adjustable means for packing different types of feeds into an agricultural bag.

These and other objects will be apparent to those skilled in the art.

DESCRIPTION OF THE PREFERRED EMBODIMENT

Figure 1:
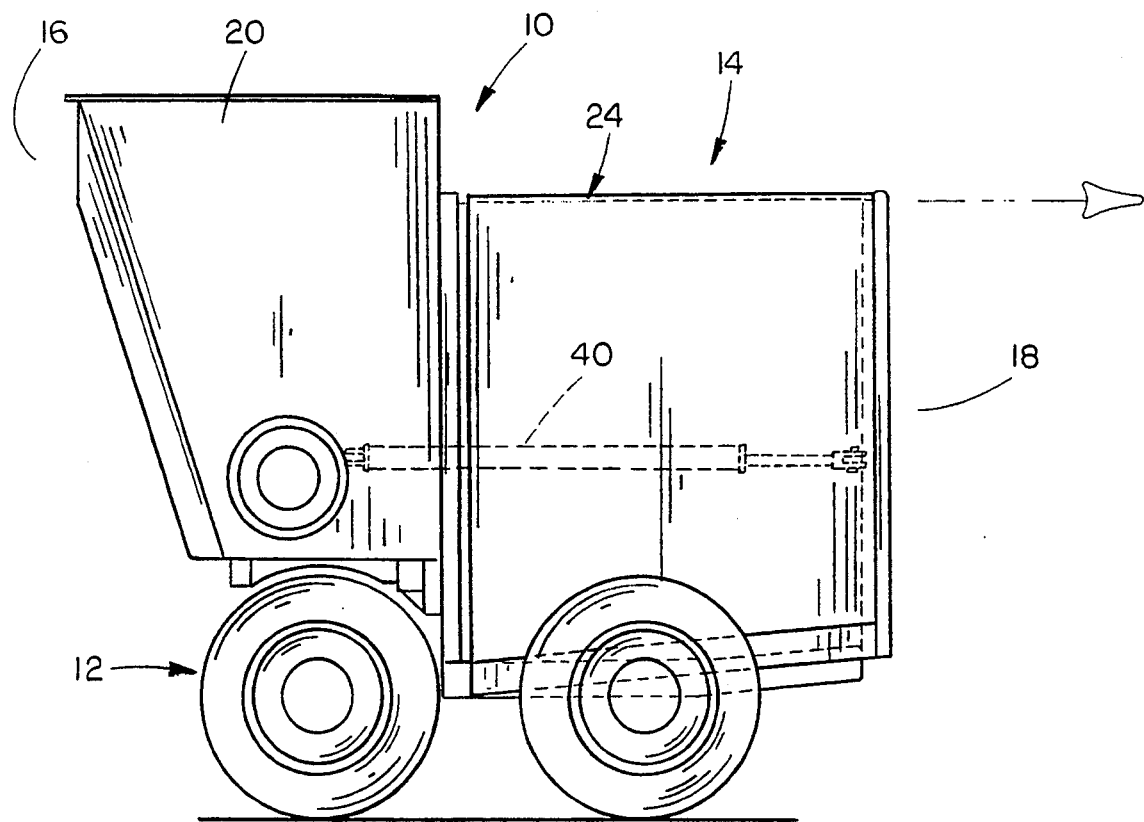
FIG. 1 is a side view of the machine with the outer tunnel shell in an extended position.

The numeral 10 refers to an agricultural feed bagging machine which is substantially conventional in design except for the length adjustable tunnel as will be described hereinafter.

Machine 10 includes a wheeled frame means 12 having a tunnel 14 mounted thereon upon which is normally positioned the open mouth of a conventional agricultural bag. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A rotatable rotor 22 of conventional design is located at the lower end of the hopper means 20 for forcing the materials to be bagged into the tunnel 14 and into the bag in conventional fashion.

Tunnel 14 includes an inner tunnel shell 24 including a top wall 26 and opposite side walls 28 and 30. The numeral 32 refers to an outer tunnel shell which is movably mounted on the inner tunnel shell 24 and which includes a top wall 34 and opposite side walls 36 and 38. Tunnel 14 also includes a floor portion 39 of fixed length and a bag pan, both of conventional design.

A pair of hydraulic cylinders 40 and 42 are provided in the tunnel 14 at opposite sides thereof for selectively moving the outer tunnel shell 32 relative to the inner tunnel shell 24. The forward or base ends of each of the cylinders 40 and 42 are operatively connected to the machine frame by any convenient means. As seen in the drawings, the cylinders 40 and 42 are substantially horizontally disposed and have their rod ends operatively connected to attachment lugs 44 and 46 which are secured to the inner rearward surface of outer tunnel shell 32.

If required, the inner and outer tunnel shells could be provided with mating slide or guide surfaces therebetween to aid in maintaining the tunnel shells in proper alignment. Further, it is recommended that protective housings 48 and 50 enclose the hydraulic cylinder as illustrated in the drawings.

Figure 2:
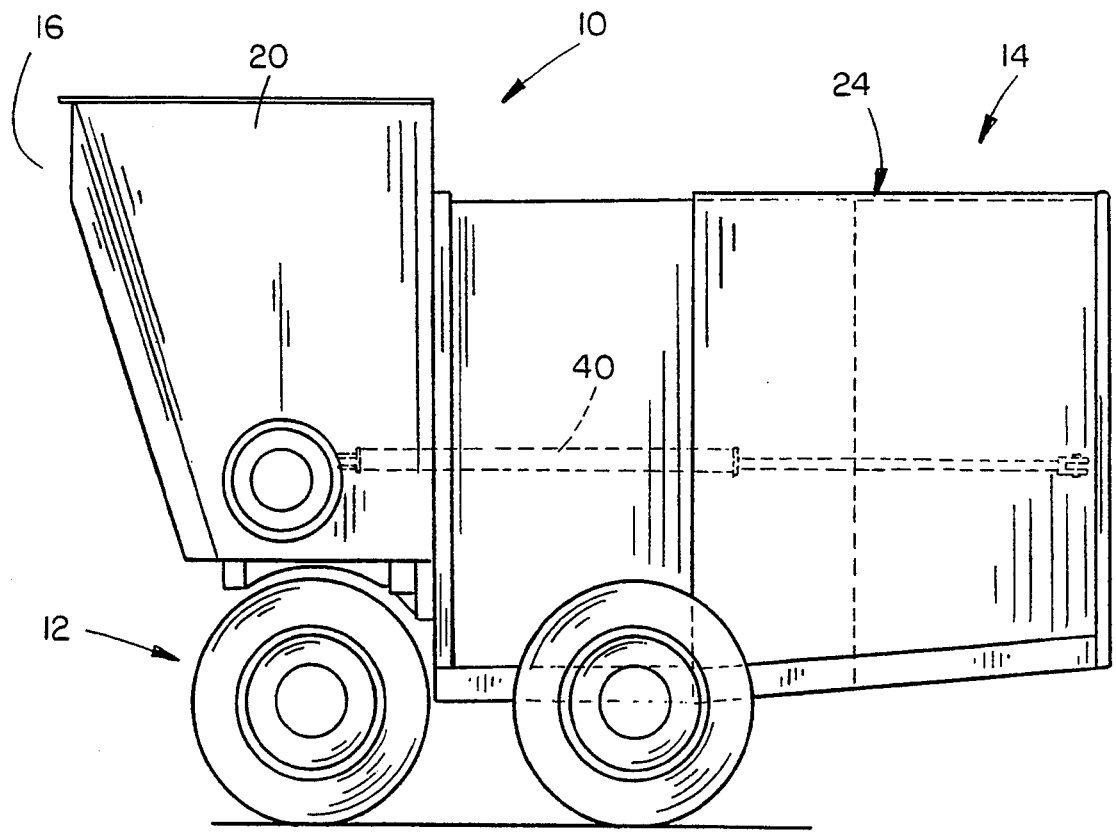
FIG. 2 is a view similar to FIG. 1 expect that the outer tunnel shell is in its retracted position.
Figure 3:
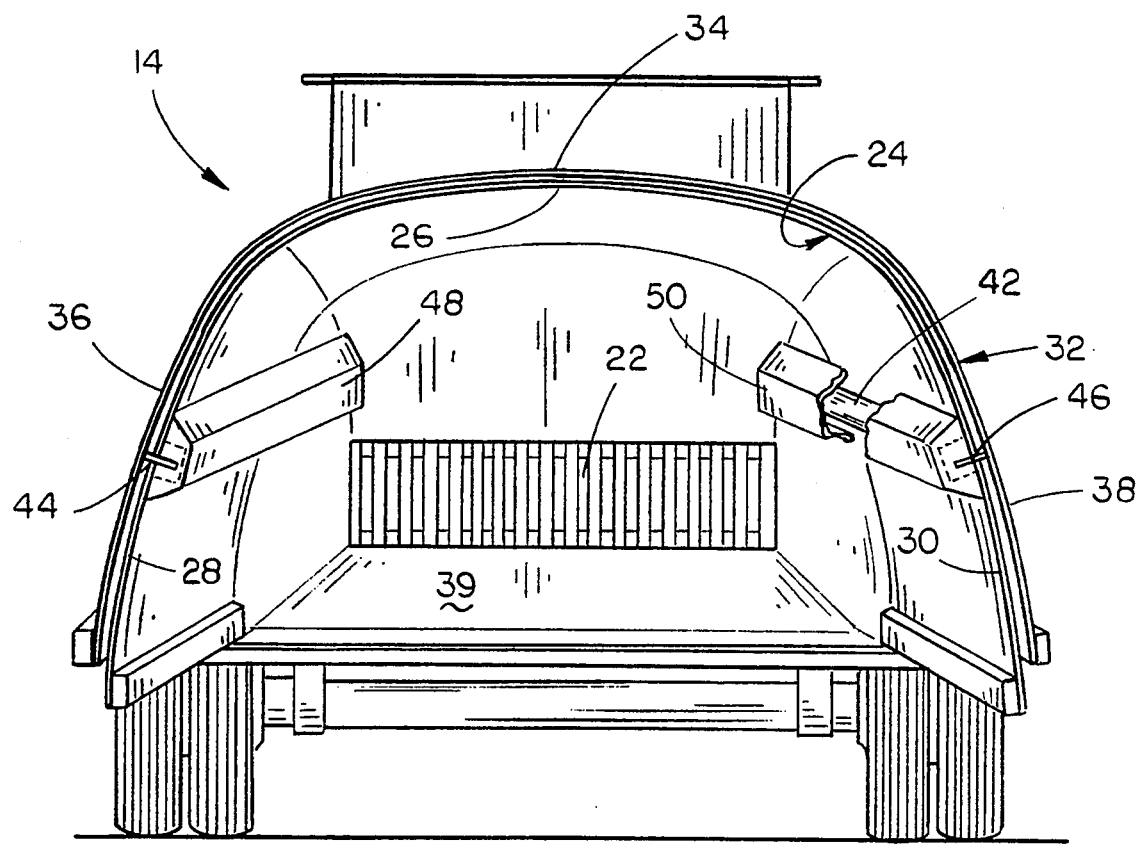
FIG. 3 is a rear view of the length adjustable tunnel.

FIG. 1 illustrates the outer tunnel shell 32 in its extended position relative to inner tunnel shell 24. FIG. 2 illustrates the outer tunnel shell 32 in its retracted position relative to inner tunnel shell 24. When the tunnel is in the retracted position illustrated in FIG. 2, the tunnel will offer less resistance to the compaction of the material. When the tunnel is in the extended position of FIG. 1, the tunnel will offer greater compaction resistance to the material. Thus, the adjustable feature of the outer tunnel shell with respect to the inner tunnel shell provides an adjustment means for accommodating various types of feeds having varying moisture contents or varying length of cuttings. The fact that the tunnel length may be selectively increased to offer greater resistance to the compaction of the material within the tunnel also enables the width of the tunnel to be reduced, and hence the width of the machine, while still achieving the necessary resistance to the compaction of the material within the tunnel.

Thus it can be seen that the invention accomplishes at least all of its stated objectives.

I claim:

1. An agricultural feed bagging machine for bagging agricultural feed material into agricultural bags having a closed end and an open mouth comprising, a frame having rearward and forward ends, a hopper on said frame at the forward end thereof for receiving the material to be bagged, means in communication with said hopper for forcing the material to be bagged rearwardly therefrom, a tunnel means on said frame and having an intake end for receiving the material being forced rearwardly from said hopper and an output end adapted to receive the open mouth of the agricultural bag, said tunnel means including a top wall and opposite side walls, said tunnel means comprising a fixed inner tunnel shell having an outer tunnel shell selectively movably mounted thereon, and moving means connected to said outer tunnel shell for selectively moving said outer tunnel shell rearwardly and forwardly with respect to said inner tunnel shell for increasing and decreasing the length of said tunnel means respectively.

2. The machine of claim 1 wherein said moving means comprises a hydraulic cylinder means.

3. The machine of claim 1 wherein said moving means comprises a first hydraulic cylinder positioned in said tunnel means at one side thereof and a second hydraulic cylinder positioned in said tunnel means at the other side thereof.

4. The machine of claim 3 wherein an enclosure means encloses each of said hydraulic cylinders.

* * * * *